United States Patent [19]
Hunter

[11] 4,080,980
[45] Mar. 28, 1978

[54] BACKFLOW PREVENTING VALVE CONSTRUCTION

[75] Inventor: Edwin J. Hunter, Rancho Santa Fe, Calif.

[73] Assignee: The Toro Company, San Marcos, Calif.

[21] Appl. No.: 695,176

[22] Filed: Jun. 11, 1976

[51] Int. Cl.² .......................................... F16K 24/00
[52] U.S. Cl. ................................... 137/218; 137/529; 251/77
[58] Field of Search ................. 137/115, 218, 529; 251/77

[56] References Cited
U.S. PATENT DOCUMENTS

| | | | |
|---|---|---|---|
| 2,518,387 | 8/1950 | Shaw | 137/529 X |
| 2,644,480 | 7/1953 | Earle et al. | 137/529 X |
| 2,659,382 | 11/1953 | Ifield | 251/77 X |
| 2,859,762 | 11/1958 | Banker | 137/115 X |
| 3,113,172 | 12/1963 | Barr | 137/529 X |
| 3,197,960 | 8/1965 | Forster | 137/115 X |
| 3,724,487 | 4/1973 | Hunter | 137/218 |
| 3,799,498 | 3/1974 | Wickham et al. | 251/77 |

*Primary Examiner*—Irwin C. Cohen
*Attorney, Agent, or Firm*—Poms, Smith, Lande & Glenny

[57] ABSTRACT

An improved backflow preventing valve having an inlet passage opening to an intermediate chamber via an improved inlet check valve with the intermediate chamber opening to an outlet passage via an improved outlet check valve. A diaphragm chamber communicates with the intermediate chamber having a diaphragm therein dividing the diaphragm chamber into an inlet pressure portion opening into the inlet passage and an intermediate pressure portion opening to the intermediate chamber. An exhaust passage opening to atmosphere communicates with the intermediate pressure portion whereby fluid normally flows from the inlet passage through the intermediate chamber to the outlet passage but upon attempted backflow of the fluid, the improved check valves close with a positive closing action to prevent such backflow and, upon failure of the outlet check valve, the diaphragm flexes to open to vent such backflowing fluid out the exhaust passage. Before failure of the outlet check valve, an improved relief valve associated with the diaphragm compensates for slight flexing of the diaphragm to prevent fluid spitting due to slight changes in the pressure of the incoming fluid while permitting fluid to be subsequently exhausted out of the exhaust passage.

18 Claims, 6 Drawing Figures

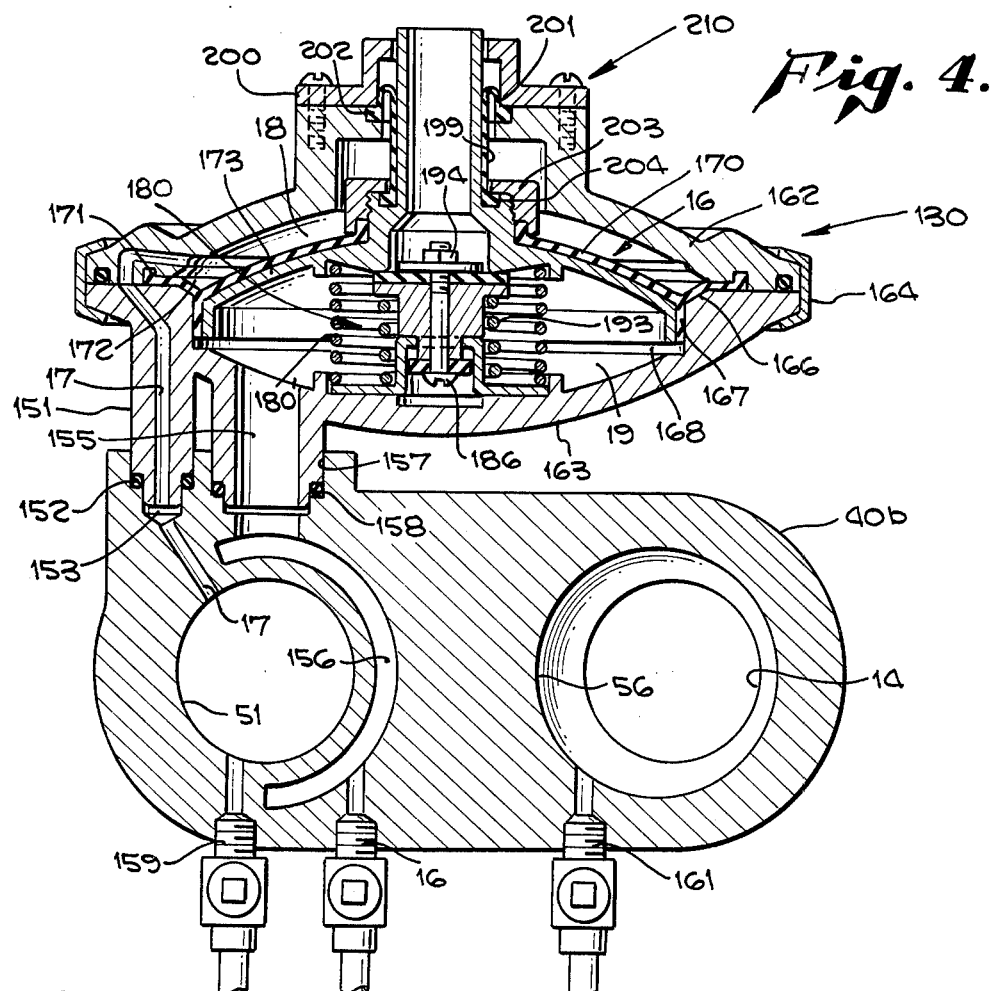
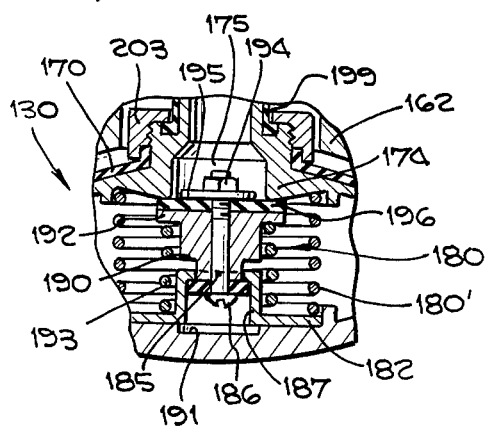
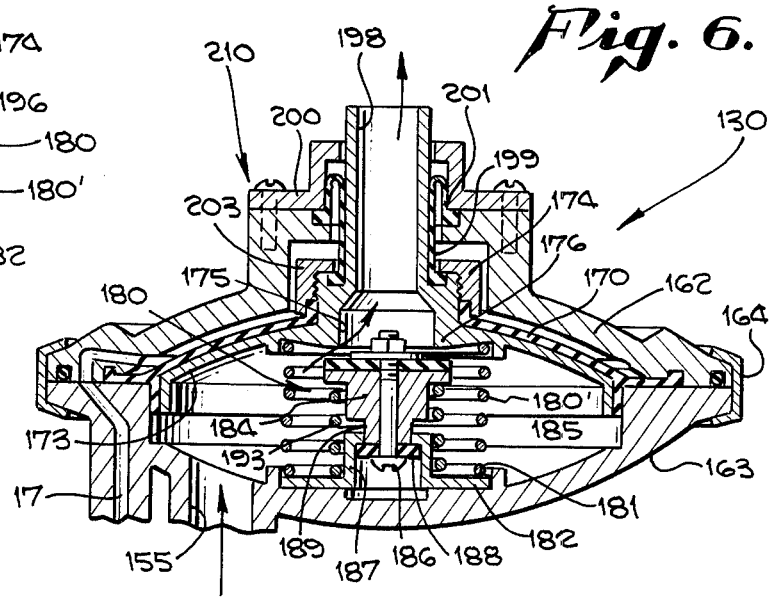

BACKFLOW PREVENTING VALVE CONSTRUCTION

BACKGROUND OF THE INVENTION

1. Field of the Invention

The invention relates to valves; and, more particularly, to back flow preventing valves which prevent backflow to avoid contamination of the supply fluid.

2. Description of the Prior Art

In my prior U.S. Pat. No. 3,724,487, I disclosed a backflow preventing valve for preventing the flow of fluid from the outlet passage back into the inlet passage, even under conditions which normally cause fluid backflow such as back pressure or siphonage.

In the valve of the present invention, I disclose inlet and outlet check valves which open and close in an improved manner. It is desirable that such check valves have the necessary force for positioning and securely closing the check valve without providing undue resistance to the continued opening of the check valve after reaching an initial open position.

Futher, in accordance with the present invention, I disclose an improved diaphragm operated relief valve having a resiliently mounted valve member movable with relation to the diaphragm. In my prior patent, the exemplary diaphragm is coupled by spring means to the movable valve member. In order to replace such diaphragm or otherwise service the interior of the relief valve housing, it may be necessary to disconnect the diaphragm from the spring connection to the valve member and related components. In addition, in my prior patent, the relief valve seat means normally would remain stationary with minor flexing of the diaphragm under slight variations in fluid pressure. In the valve of the present invention, the slight flexing of the diaphragm does not cause the outlet exhaust passage to open.

SUMMARY OF THE INVENTION

It is an object of this invention to provide an improved backflow preventing valve.

It is a further object of this invention to provide a backflow valve having improved inlet and outlet check valves which include a booster force for closing each check valve without providing an undesirable increased resistance to opening each check valve after reaching an initial open position.

It is still another object of this invention to provide an improved backflow preventer valve having a diaphragm operated relief valve with a resiliently mounted valve member movable relative to the diaphragm to exhaust fluids out of the valve while permitting slight flexing of the diaphragm without exhausting fluids out of the valve due to slight changes in pressure in the valve.

These and other objects are preferably accomplished by providing an improved backflow preventing valve having an inlet passage opening to an intermediate chamber via an improved inlet check valve with the intermediate chamber opening to an outlet passage via an improved outlet check valve. A diaphragm chamber communicates with the intermediate chamber having a diaphragm therein dividing the diaphragm chamber into an inlet pressure portion opening into the inlet passage and an intermediate pressure portion opening to the intermediate chamber. An exhaust passage opening to atmosphere communicates with the intermediate pressure portion whereby fluid normally flows from the inlet passage through the intermediate chamber to the outlet passage but upon attempted backflow of the fluid, the improved check valves close with a positive closing action to prevent such backflow and, upon failure of the outlet check valve, the diaphragm flexes to open to vent such backflowing fluid out the exhaust passage. Before failure of the outlet check valve, an improved relief valve associated with the diaphragm compensates for slight flexing of the diaphragm to prevent fluid spitting due to slight changes in the pressure of the incoming fluid while permitting fluid to subsequently be exhausted out of the exhaust passage.

BRIEF DESCRIPTION OF THE DRAWINGS

FIG. 2 is an enlarged view taken along the plane II—II of FIG. 1 showing the construction of a check valve of the backflow preventing valve of FIG. 1;

FIG. 3 is a view similar to FIG. 2 showing an alternate position of the components of the check valve of FIG. 2;

FIG. 4 is a top cross-sectional view taken along the plane IV—IV of FIG. 1;

FIG. 5 is a detailed sectional view of a portion of the relief valve of FIG. 4 showing movement of the resiliently mounted valve member with slight diaphragm movement without opening of the relief valve; and FIG. 6 is a detailed sectional view of the relief valve portion of the apparatus of FIG. 4 showing the valve in open position.

DESCRIPTION OF THE PREFERRED EMBODIMENT

Figure 1:
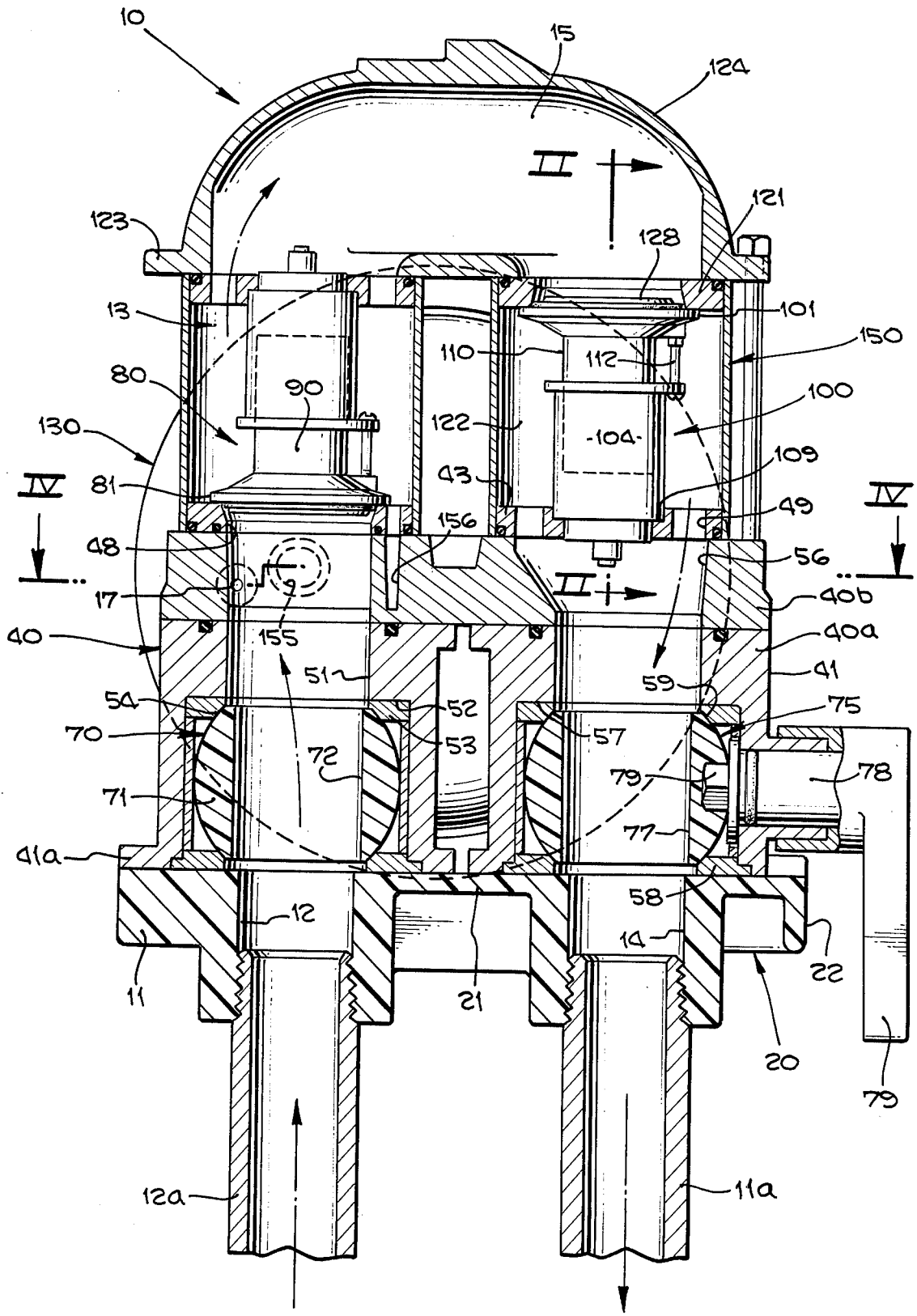
FIG. 1 is a vertical cross-sectional view of a preferred exemplary embodiment of a backflow preventing valve, according to this invention.

Referring now to the drawings and particularly to FIG. 1, the preferred exemplary embodiment of the improved backflow preventing valve, according to this invention, is generally denoted by the numeral 10. The valve 10 is for installation in a water or other fluid system having a fluid source and a receiver for fluid which are to be kept separate except when there are suitable pressures to cause flow from the source to the receiver. The instant invention is an improvement of the backflow preventing valve described and claimed in my U.S. Pat. No. 3,724,487 and reference should be made thereto for examples of uses for such system.

Generally, valve 10 includes a body 11 having an inlet passage 12 coupled to an inlet 12a leading to a source of fluid; an intermediate chamber 13 fluidly connected to the inlet passage 12 via an inlet check valve 80; an outlet passage 14 fluidly connected to the intermediate chamber 13 via an outlet check valve 100 and for connection to an outlet 11a leading to a receiver of fluid (not shown); an exhaust passage 198 fluidly connected to the intermediate chamber 13 controlled by a relief valve 180 (see FIG. 4) and opening to atmosphere; a diaphragm chamber 16 (FIG. 4) fluidly connected to the inlet passage 12 via an interconnecting passage 17 (FIG. 4) and to the intermediate chamber 13; and a diaphragm 170 (FIG. 4) in the diaphragm chamber 16 to divide the diaphragm chamber 16 into an inlet pressure portion 18 and an intermediate pressure portion 19.

As discussed in my prior U.S. Pat. No. 3,724,487, the valve 10 may be comprised of a plurality of molded parts, such as a lower barrel part 20, a case part 40, a diaphragm housing part 130 (FIG. 4), a diaphragm support housing part 150 (see also FIG. 4) with holding means for holding the parts together.

The lower barrel part 20 is preferably molded from a suitable plastic material to reduce the cost of valve 10. Part 20 has a generally circular bottom wall 21 from which a downwardly cylindrical sidewall 22 extends. Of course, part 20 may be similar to that in my prior U.S. Pat. No. 3,724,487. Inlet passage 12 and outlet passage 14 are internally threaded as shown for receiving inlet 12a and outlet 11a therein.

Case part 40, FIG. 1, has a cylindrical side wall 41 with a peripheral flange 41a for abutting against the upper surface of part 20 for securement thereto in any suitable manner, such as glueing, nuts and bolts, etc. Part 40 includes a lower section 40a and an upper section 40b, with the upper surface of upper section 40b closed off by a transverse web 43. These parts 40a, 40b and web 43 may be secured together in any suitable manner with suitable O-rings provided, as shown, where necessary. Web 43 has an opening 48 aligned with an opening through part 40 to form a hollow left or inlet opening 51. As shown in FIG. 1, opening 51 is aligned with the inlet opening 12. Part 40a has a first valve chamber 52 receiving therein a ball valve housing 53. As can be seen, housing 53 includes four corner shoulders 54 curved as shown for permitting ball 71 to rotate therein, as will be discussed.

Web 43 also has an opening 49 aligned with an opening through part 40 to form a hollow right or outlet opening 56. As shown in FIG. 1, opening 56 is aligned with the outlet opening 14. Part 40a has a second valve chamber 57 receiving therein a ball valve housing 58. As can be seen, housing 58 includes four corner shoulders 59 curved as shown for permitting ball 76 to rotate therein, as will be discussed.

As previously discussed, case part 40 mounts in edge to edge contact with the lower barrel part 20 retaining the inlet and outlet barrel valves 70 and 75 therebetween.

The barrel valves 70 and 75 are provided for controlling fluid flow respectively through the inlet passage 12 and the outlet passage 13. The barrel valves 70 and 75 are similar in construction and may also be molded of a suitable material, such as plastic. The inlet barrel valve 70 includes ball 71, as discussed, with an aperture 72 therethrough. The outlet barrel valve 75 includes ball 76, as discussed with an aperture 77 therethrough and a handle 78 extending therefrom secured by a suitable bolt 79. Balls 71 and 76 are located between spherical surfaces 54, 59, respectively, with handle 78 extending out of part 40 terminating in a transversely extending outer handle portion 79. Both valves 70 and 75 include similar structure for rotating balls 71, 76, the structure for rotating ball 71 not shown for convenience of illustration. Thus, ball 71 is rotatable between an open position wherein the aperture 72 is aligned with openings 51, 48 and a closed position wherein aperture 72 is not aligned with and does not open openings 51, 48 to control the flow through inlet passage 11. Outlet valve 75 is also rotatable, via handle portion 79, between an open position and a closed position to control the flow through the outlet passage 14. The fluid flow, manually controlled by barrel valves 70 and 75, is also automatically controlled against backflow by the check valves 80 and 100.

The inlet check valve 80 is for permitting flow in one direction in the inlet passage 12 and for preventing flow in the other direction in the inlet passage 12. The inlet check valve 80 is a unit with the main divisions thereof being a seat 81, a piston 90 and a spring (not shown) — see FIGS. 2 and 3 — the outlet check valve 100 is identical in construction to inlet check valve 80 and thus the same structure appears in each and the description of one valve is the same as that for the other.

Figures 2, 3:
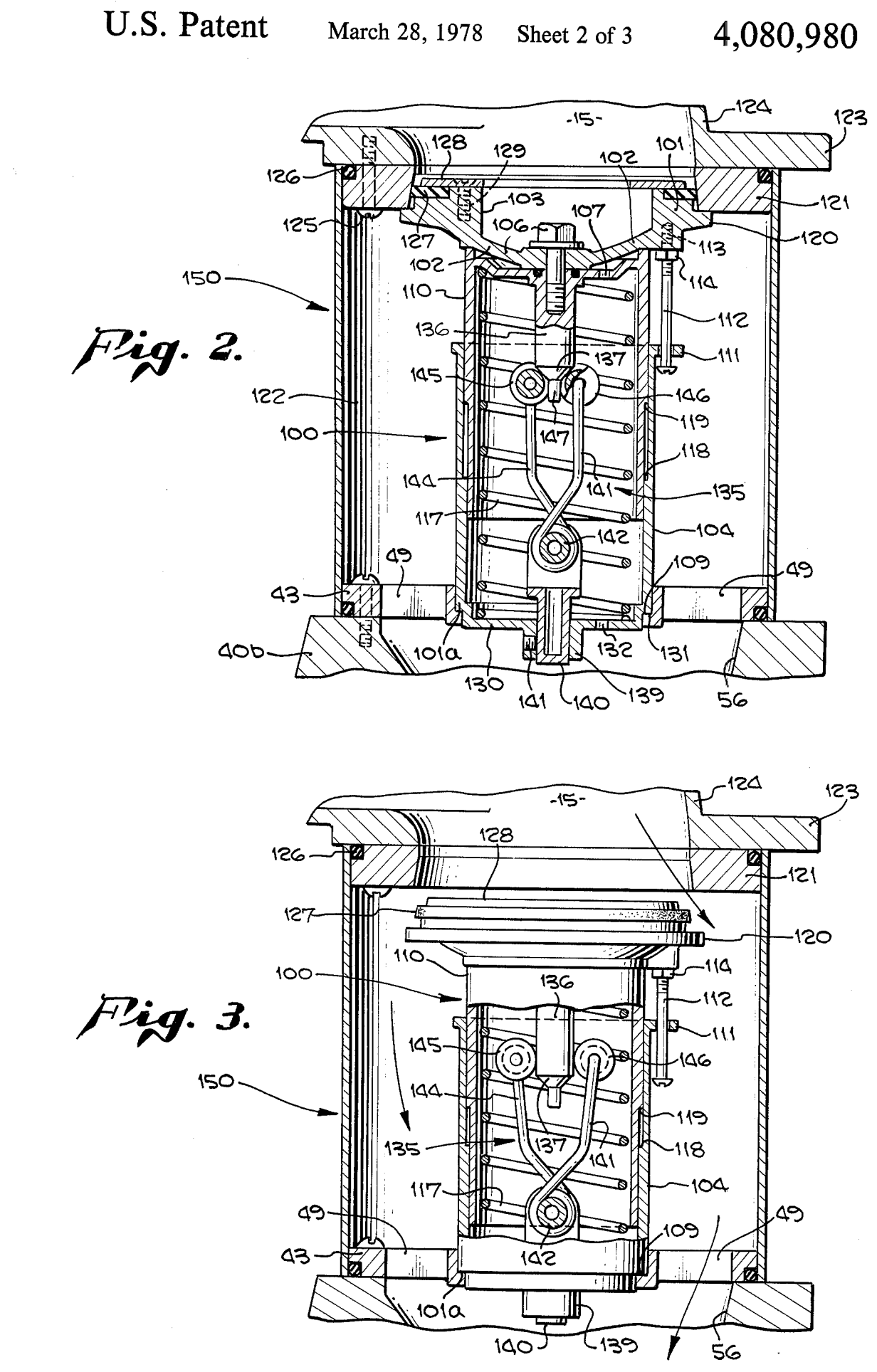

Thus, referring now to FIGS. 2 and 3, the outlet check valve 100 is provided for permitting flow in one direction in the outlet passage 14 and for preventing flow in the other direction in the outlet passage 14. The outlet check valve 100 includes opposite seats 101 and 101a, a piston 110 and a spring 117. Valve 100 is retained within housing 150, as shown, and aligned with openings 49, 56 and inlet passageway 14. Valve 100 includes a tubular wall 104 of a configuration at its lower end to seat in seating surface 109 to complete seat 101a with the opening 49 in web 43.

The piston 110 for valve 100 is generally cylindrical and movable within tubular wall 104. Seat 101 includes a web portion 102 forming a chamber 103 therein and secured to a web 105 closing off one end of piston 110 by a suitable nut and bolt 106. An opening 107 is provided in web 105 for bleeding valve 100, as will be discussed.

Piston member 104 includes an apertured flange 111 receiving a bolt 112 therein for securing member 104 to seat 101 by threaded end 113 of bolt 112 threaded into seat 101 with nut 114 retaining bolt 112 thereon. This provides a means for retaining the assembled components together when the piston assembly is removed from valve 100. A shoulder 118 on the inner wall of outer piston member 104 cooperates with a shoulder 119 on inner piston member 110 to act as a stop for inner piston member 110.

Seat 101 has a peripheral shoulder 120 for seating on an apertured flange or seat 121 closing off the upper portion of the upper housing part 150 of the outlet valve chamber 122. Seat 121 is secured to the bottom flange 123 of a semi-hemispherical shaped wall or housing 124 forming exhaust passage 15 by suitable bolts 125 with suitable O-rings 126 located as shown for sealing the same. A sealing ring 127 is provided on seat 101 retained thereon by an apertured ring member 128 secured to seat 101 by suitable bolts 129.

The bottom or lower end of outer piston member 104 is closed off by a wall 130 having a peripheral shoulder 131 forming a seat for seating on web 43. A bleed hole 132 is provided in wall 130. As can be seen, spring 117 is retained within piston members 104, 110 between wall 130 and web 105.

As particularly contemplated in the present invention, booster means 135 are provided in each piston for forcibly closing each valve 80, 100 without increasing the force for opening each valve 80, 100 after reaching the initial open position. In the exemplary embodiment of the invention, such booster means 135 includes a shaft 136 depending downwardly from web 105 with bolt 106 extending therein. Shaft 136 is disposed substantially along the central longitudinal axis of spring 117. This shaft 136 includes a main body portion of generally uniform diameter terminating in a tapered head 137 having reduced ramp portions 138 which may be about 45° with respect to the central longitudinal axis of shaft 136. Wall 130 includes a cavity or well portion 139 aligned with shaft 136 receiving therein a spring retaining member 140 retained therein by a set screw 141 or the like. Spring retainer member 140 is secured to one end of a clothsepin-shaped spring 141. As can be seen in FIG. 2, a boss 142 is provided on member 140 with spring 141 encirculing the same. Spring 141 is thus one continuous piece encircling boss 142 and having two arms 143, 144 extending upwardly away from member 140 on both sides of the central longitudinal axis of shaft 136. A pair of rollers 145, 146 are rotatably mounted on the free ends of each arm 143, 144. As can be seen in FIG. 2, the arms 143, 144 of spring 141 exert an inward force on rollers 145, 146. Thus, the rollers 145, 146 bear against ramp portions 138 on each side of the pin 147. Spring 141 may be preadjusted so as to compensate for manufacturing tolerances with rollers 145, 146 bearing against ramp portions 138 and not riding on pin 147.

Spring 117 acts on piston member 110 to bias it upwardly against the seat 121 to a closed position while the flow of fluid acting on top of piston member 110 will move piston member 110 downwardly against the biasing of the spring 117 to an open position.

As previously discussed, valve 80 is identical in construction to valve 100 but reversed in orientation. The spring of valve 80 (comparable to spring 117) biases the inner piston member therein downwardly against surface 88 to close inlet check valve 80 with fluid pressure on the underside of the inner piston member moving the inner piston member upwardly against the biasing of the spring therein to open the inlet check valve 80. The frustoconical inner surface 88 cooperates with seat 81 to wedge the sealing ring thereon (comparable to ring 127) between the seat 81 and the inner piston member to seal the juncture therebetween. This wedging sealing action continues even as the seal ring wears to provide a reliable seal. Obviously, the surface 88 may be provided on the seat 81 to obtain such advantageous features as discussed in my prior U.S. Pat. No. 3,724,487.

Booster means 135, although described as forming a means for providing an added booster force on both the inlet and outlet valves 80 and 100, is normally used only on the inlet valve 80. The differential pressure across inlet valve 80 operates the relief valve 180, to be described, and therefore only the inlet valve 80 requires a higher differential pressure. The outlet check valve 100 operates at a very low differential pressure, e.q., 1½ to 2 psi versus approximately 6 psi in the inlet check valve 80. However, in accordance with the teachings of my invention, booster means 135 may be provided on both valves 80 and 100, if desired.

However, in both valves 80 and 100, booster means 135 provides the added booster force according to the present invention for positively closing each valve 80, 100 but without increasing the resistance to opening each valve 80, 100 after reaching the initial open position. Referring to FIGS. 2 and 3, as valve 100 opens (FIG. 3), rollers 145, 146 move along the ramp portions 138 until they have reached the major diameter or main body portion of shaft 136 as shown in FIG. 3 at which time further opening of the valve 100 causes the rollers 145, 146 to move along the shaft 136 with virtually no resistance for rolling friction. The clothespin-shaped spring 141 exerts an inward force on the rollers 145, 146 along with the force of spring 117. As valve 100 closes and the rollers 145, 146 reach ramp portions 138, the force of spring 141 through the rollers 145, 146 exerts a positive, upward force on the valve 100 causing it to close in a snap-lock manner. The force necessary for closing the valve 100 may be obtained by increasing the loading on helical spring 117. However, this would cause an increased loading on the valve 100 the farther it opens and would result in a higher friction loss. Thus, the provision of booster spring 141, as compared to the use of a larger compression spring 117 alone, provides an increased closing force without an increase in continued opening force. The advantage of the force of a larger compression spring is obtained with a reduced force thereafter. Thus, booster means 135 gives a necessary force at the beginning of the stroke to give the pressure differential required to operate relief valve 180, but does not continue to increase appreciably as relief valve 180 opens further and thereby presents a desirable friction loss characteristic at higher flow values.

As seen in FIG. 4, the diaphragm housing part 130 is separated from the case part 40 which differs from the valve disclosed in my U.S. Pat. No. 3,724,487. As shown in FIG. 4, upper part 40b has inlet passage 17 opening into opening 51 above ball 71 passing through a housing portion 151 sealed via an O-ring 152 in a cavity 153 in part 40b. Housing portion 154 includes a throughpassage or exhaust passage 155 opening into an exhaust chamber 156 extending partway about opening 51. Housing portion 154 is also sealed in an opening 157 in part 40b via an O-ring 158. A fluid inlet 159 communicates with the interior of opening 51 and a fluid inlet 160 communicates with the interior of chamber 156. A fluid inlet 161 communicates with the interior of opening 56. Diaphragm housing part 130 is comprised of mating sections 162, 163 retained together by an annular flange 164. A passageway 165 is formed in upper section 162 communicating with inlet passage 17. The upper portion of section 163 has an annular shoulder 166 and an annular groove 167 is provided on the interior of section 162. A space 168 is provided on the interior of section 163 between the bottom of a flange on a diaphragm support 173 and the shoulder 168' to assure that diaphragm 170' and its support seat on the seat of the relief valve 180 does not bottom out on the support 173 itself. Section 162 also has an annular ridge 169 for retaining therein diaphragm 170 in a manner preventing diaphragm 170 from being pinched.

Diaphragm 170 is a rubber disk with an annular lip 171 for insertion inside ridge 169 and a groove 172 in the inner wall of section 162 for sealing pressure between the chambers 18 and 19. A diaphragm support 173 is centrally located on the diaphragm 170 to transfer the load of the differential hydraulic pressure to the seat of valve 180 and hold it firmly against the relief valve seal 196. The support 173 has a centrally located boss 174 having a throughbore 175. Boss 174 has a downwardly extending chamfered peripheral edge 176 bearing against the upper surface of relief valve 180.

In my prior U.S. Pat. No. 3,724,487, the diaphragm is resiliently connected directly to the relief valve. In the exemplary embodiment of the invention, the improved relief valve 180, lower section 163 includes a central cavity 181 retaining therein a valve spring retainer 182. The valve stem 183 includes a valve body 184 having a bolt 185 extending therethrough, the head 186 being disposed within an upstanding cylindrical portion 187 of retainer 182 with a resilient washer 188 between head 186 and stem 183. Valve body 184 includes a reduced diameter portion 189 with cylindrical portion 187 terminating at the upper edge in an inwardly extending peripheral lip 190 bearing against the undersurface of a shoulder or stop means on the valve body 183, as shown, with head 186 and washer 188 vertically movable in the space between lip 190 and a centrally located cavity 191 or stop means for head 186 in section 193.

Valve body 183 also includes an outwardly extending flange 192 at its upper end with a resilient helical spring 193 retained between flange 192 and the bottom wall of retainer 182. This provides means for limiting the movement of the valve body 183, as will be discussed. Bolt 185 extends into opening 175 and is threaded at this end for receiving a nut 194 with a washer 195 between nut 194 and a resilient sealing means, such as a washer seal 196.

A diaphragm spring 180' operates relief valve 180 when the differential pressure across diaphragm 170 has been reduced to a predetermined minimum. For example, when the differential pressure across diaphragm 170 is reduced from a normal operating difference of 5 or 6 psi to a difference of only 2½ or 3 psi, the energy of spring 180' is such as to force diaphragm 170 to its open position, opening relief valve 180 and allowing water in the zone to drain out to atmosphere, providing an atmosphere break between check valves 80 and 100.

The throughbore of boss 174 of support 173 communicates with an exhaust outlet 198 integral therewith with a rolling diaphragm 199 surrounding outlet 198. Diaphragm 199 is retained, at its upper end, by a top plate 200 secured to section 162 by suitable screws or bolts 210, and having a peripheral bead 201 engaging a flanged end 202 on sleeve 199. A nut 203 is threaded on the outer surface of boss 174 and retains the lower flanged end 204 of diaphragm 199 therein. Flanged ends 202 and 204 are configured as shown for retaining such ends in fixed position when the relief valve is moved, as will be discussed. As can be seen, the upper end of the relief valve 180 (i.e., washer seal 196 and flanged end 192) works against shoulder 176.

Diaphragm 199 seals the high pressure chamber from the atmosphere and acts as a balance so that operation of relief valve 180 is not a function of actual line pressure but only a function of the differential pressure across diaphragm 170.

Support 173 is movable in response to fluid pressure on its underside to a raised position (FIG. 6) when fluid from inlet 155 passes along the flutes and into the cross member passage 168, with the diaphragm 170 opening and closing (compare FIGS. 4 and 6) in response to differential fluid pressure applied to diaphragm 170. The upper extent of movement of relief valve 180 is limited by engagement of washer 188 whth the flange 190 of retainer 182. The limited movement thus provided allows for slight movement of the diaphragm as upon sudden variations in the fluid pressure in the valve housing, without the diaphragm 170 separating from the valve seal 196 and thus avoiding fluid spitting during slight flexing of the diaphragm as seen in FIG. 5.

Only slight flexing of diaphragm 170 is possible, however, since upon greater flexure of the diaphragm 170 due to a leak past the outlet check valve 100, relief valve 180 will be opened as in FIG. 6 to exhaust fluid out of outlet 198 and prevent a back pressure from being applied to the inlet check valve 80. Resilient seal 188 prevents water from leaking along the bolt 185 to the atmosphere and acts as a stop preventing the valve assembly from separating when the relief valve 180 is open.

In operation, body 11 is connected to inlet 12a leading to a souce of fluid and outlet 11a is connected to a receiver of fluid. The inlet fluid will pass along inlet passage, which includes the left barrel valve aperture 72 and past the inlet check valve 80 to the intermediate chamber 13 by unseating valve 80. The inlet barrel valve 70, upon manual rotation thereof, controls the fluid flow in the inlet passage 12. The intermediate chamber 13 of body 11 is defined by web 43 and housing part 150 with upper web 121. Typically, the pressure in the intermediate chamber 13 will be less than the fluid pressure in the inlet passage 12 because of the pressure drop caused by the inlet check valve 80.

The fluid from the intermediate chamber 13 passes into the upper chamber 15, opening check valve 100 and thus passes ball aperture 77 of the outlet barrel valve 75 out of outlet 11a to the receiver of fluid. Typically, this outlet fluid pressure will be less than the intermediate chamber fluid pressure because of the pressure drop caused by the outlet check valve 100.

Diaphragm 170 is divided into an inlet pressure portion 18 above diaphragm 170 and an intermediate pressure portion 19 below diaphragm 170. The interconnecting passage 17 (see FIG. 1) interconnects the inlet pressure portion 18 (via passageway 165 — see FIG. 4) with the inlet passage 12. The difference in the inlet fluid pressure and the intermediate chamber fluid pressure, when not balanced as shown in FIG. 4, causes diaphragm 170 to open the exhaust passages 155, 156. Diaphragm 170 is biased into such position by spring 180'.

The exhaust passages 155, 156 permit fluid to flow past relief valve 180 and out outlet 198 to the atmosphere as shown in FIG. 6.

As long as the fluid pressure is greater in the inlet passage 12 than in the outlet passage 14, the fluid will flow from its source, through the inlet passage 12 opening inlet check valve 80 to flow into the intermediate chamber 13 through chamber 15, opening outlet check valve 100 to flow through the outlet passage 14 to the receiver of fluid. If the fluid pressure in the outlet passage 14 approaches the fluid pressure in the inlet passage 12, then the check valves 80 and 100 will be closed by the combination of their springs 117 and the booster means 135 heretofore described in a quick, snap, positive manner. This wedges the sealing rings 127 against their respecting seating surfaces to seal these junctures and separate the inlet passage 12 from the intermediate chamber 13 and from the outlet passage 14.

If a sudden change occurs in the pressure of fluid flowing through the valve body 11, diaphragm 170 will flex because of the pressure differential caused thereby. In prior art valves, as discussed in my prior U.S. Pat. No. 3,724,487, this would crack open the relief valve and the fluid would spit into the exhaust passage 15 causing noise and leakage. In the improved relief valve and diaphragm of the instant invention, fluid exhausts out of outlet 198 to the atmosphere in a manner eliminating spitting and undesirable noise. Further, diaphragm 170 can be quickly and easily replaced (or housing 130 otherwise serviced) without contending with pressure exerted by springs attempting to force the components apart due to the construction of relief valve 180.

If the fluid pressure in outlet passage 14 is greater than the fluid pressure in the intermediate chamber 13 and the inlet passage 12, the check valves 80 and 100 will remain closed to prevent backflow. However, after prolonged use, even should valves 80 and 100 fail, the fluid in outlet passage 14 cannot be permitted to backflow into inlet passage 12 and possibly contaminate the supply of fluid.

The diaphragm 170 being supplied with inlet fluid pressure through the interconnecting passage 17 which is balanced by the intermediate fluid pressure and by relief valve 180 will, as the intermediate fluid pressure approaches inlet fluid pressure, flex to the FIG. 6 position. This joins the intermediate chamber 13 to the exhaust passages 155, 156 to exhaust the fluid in intermediate chamber 13 out outlet 198 to the atmosphere. Such action prevents a back pressure being applied to the inlet check valve 80 to cause the inlet check valve 80 to fail. When the pressure in the intermediate chamber 13 drops to its normally differential pressure with respect to the inlet pressure, the diaphragm 170 returns to the closed or FIG. 4 position and returns valve 10 to normal operation. Slight variations in fluid pressure are provided by the ability of relief valve 180 to move between the FIG. 4 and 5 positions.

In my prior U.S. Pat. No. 3,724,487, I disclosed selectively closable inlets for providing fluid when needed. As shown in FIG. 4, inlets 159 through 161 may be provided communicating with the various chambers heretofore described for selectively admitting fluid for whatever use it may be needed.

The valve 10, according to this invention, may be attached between a potable water supply of a house and a sprinkler system with a fertilizing adding apparatus therein. With valve 10 so located, it is safe to add chemicals to the water downstream of valve 10 without fear of contaminating the drinking water of the house. As discussed in my prior patent, the various parts of valve 10 may be molded or otherwise constructed of low-cost molded parts; it is inexpensive enough to be used for the purpose.

I claim:

1. In a backflow preventing valve having a body with an inlet passage for connection to a source of fluid, an intermediate chamber fluidly connected to the inlet passage via an inlet check valve, an outlet passage fluidly connected to the intermediate chamber via an outlet check valve for connection to a receiver of fluid, passage fluidly connected to the intermediate chamber and a diaphram chamber fluidly connected to the inlet passage and to the intermediate chamber having a diaphragm therein dividing the diaphragm chamber into an inlet pressure portion and an intermediate pressure portion, said inlet pressure portion being fluidly connected to the inlet passage and said intermediate pressure portion being fluidly connected to the intermediate chamber, a relief valve operated by movemet of said diaphragm and in fluid communication with said intermediate pressure portion for venting said intermediate chamber to atmosphere when opened by said diaphragm, said body including a valve seat member and a piston receiving opening therein associated with each check valve, each of said check valves including a valve piston member mounted on the body for movement relative to its respective seat member between open and closed positions, and biasing means for biasing the piston member to the closed position in the respective opening on the respective seat member, the improvement which comprises:
at least one of said check valves further including booster means associated with said biasing means for forcibly closing said at least one of said check valves in combination with said biasing means but presenting a relatively negligible resistance to opening of said at least one of said check valves by said biasing means after said at least one of said check valves reaches an initial open position and
wherein said at least one of said check valves includes an outer piston member and a telescoping inner piston member, and said biasing means includes a spring associated with said piston members for biasing one of said piston members to a position closing off the respective opening in said valve seat member, said booster means including one of said piston members having a shaft extending generally along the central axis thereof and the other of said piston members having spring means thereon acting on said piston members for biasing the same in the same direction as said spring, said spring means operatively engaging said shaft.

2. The invention as defined in claim 1 wherein said spring means includes a spring having a first end secured to the other of said piston members and a pair of spaced arms extending from said first and generally parallel to the longitudinal axis of said shaft and on both sides thereof, said spring means further including a roller on each free end of each arm bearing against said shaft on opposite sides thereof.

3. The invention as defined in claim 2 wherein said booster means further includes said rollers engaging inwardly tapered portions on said shaft when said at least one of said check valves is closed.

4. The invention as defined in claim 3 wherein said tapered positions extend at an angle of about 45° to the longitudinal axis of said shaft.

5. The invention as defined in claim 3 wherein said shaft has a first section of generally uniform diameter and a second section of reduced diameter with said reduced portions comprising a third section interconnecting said first and second sections and tapering uniformly from said first section to said second section, said rollers bearing against said third section when said at least one of said check valves is closed, said last-mentioned spring exerting a force on said rollers against said third section when said at least one of said check valves is closed with said rollers movable along said third section until said rollers reach said first section when said at least one of said check valves initially opens whereby further opening of said at least one of said check valves causes said rollers to move along said first section with virtually no resistance thereby presenting a reduced resistance of said last-mentioned spring on the opening of said at least one of said check valves and said rollers moving along said first section to said third section when said at least one of said check valves closes, the force of said last-mentioned spring through said rollers when said rollers reach said third section exerting a force on said piston member having said shaft thereon along with the spring force of said first-mentioned spring thereby positively closing said at least one of said check valves.

6. The invention as defined in claim 5 wherein said at least one of said check valves including said booster means is said inlet check valve.

7. In a check valve having a valve body comprising a valve seat member on the body and having a piston receiving opening therein, a valve piston member including an outer piston member and a telescoping inner piston member mounted on the body for movement relative the seat member between open and closed positions, biasing means for biasing the piston member to the closed position in the opening on the seat member, the improvement which comprises:
booster means associated with said biasing means for forcibly closing said at least one of said check valves in combination with said biasing means but presenting a relatively negligible resistance to opening of said at least one of said check valves by said biasing means after said at least one of said check valves reaches an initial open position, and wherein said biasing means includes a spring associated with said piston members for biasing one of said piston members to a position closing off the respective opening in said valve seat member, said booster means including one of said piston members having a shaft extending generally along the central axis thereof and the other of said piston members having spring means thereon acting on said piston members for biasing the same in the same direction as said spring, said means means operatively engaging said shaft.

8. The invention as defined in claim 7 wherein said spring means includes a spring having a first end secured to the other of said piston members and a pair of spaced arms extending from said first end generally parallel to the longitudinal axis of said shaft and on both sides thereof, said spring means further including a roller on each free end of each arm bearing against said shaft on opposite sides thereof.

9. The invention as defined in claim 8 wherein said booster means further includes said rollers engaging inwardly tapered portions on said shaft when said at least one of said check valves is closed.

10. In a backflow preventing valve having a body with an inlet passage for connection to a source of fluid, an intermediate chamber fluidly connected to the inlet passage via an inlet check valve, an outlet passage fluidly connected to the intermediate chamber via an outlet check valve for connection to a receiver of fluid, a diaphragm chamber fluidly connected to the inlet passage and to the intermediate chamber and having a diaphragm therein dividing the diaphragm chamber into an inlet pressure portion and an intermediate pressure portion, a backing plate in said diaphragm chamber supporting said diaphragm and a sole relief valve in fluid communication with said intermediate pressure portion and operable by said diaphragm and backing plate to vent said intermediate pressure portion to atmosphere through an exhaust passage through said backing plate and having a valve seat and a sole valve seal means, said inlet pressure portion being fluidly connected to the inlet passage and said intermediate pressure portion being fluidly connected to the intermediate chamber, said body including a valve seat member and a piston receiving opening therein associated with each check valve, each of said check valves including a valve piston member mounted on the body for movement relative to its respective seat member between open and closed positions, and biasing means for biasing the piston member to the closed position in the respective opening on the respective seat member, the improvement which comprises:

said valve seal means bearing against said backing plate closing off fluid communication between said exhaust passage and said intermediate pressure portion allowing slight movement of said diaphragm whereby, upon variations in the fluid pressure said diaphragm flexes a limited amount, but upon a leak of fluid from said outlet passage into said intermediate chamber, said diaphragm flexes beyond said limited amount with said backing plate moving away from abutment with said relief valve causing a space to open between said backing plate and relief valve thereby opening fluid communication between said intermediate chamber and said exhaust passage exhausting excess fluid from said intermediate chamber through said exhaust passage to the atmosphere to avoid contaminating the fluid supply, said relief valve includes a valve body having said sole valve seal means normally closing off the opening communicating said intermediate pressure portion with said exhaust passage, and relief valve limiting means associated with said valve body for permitting limited movement of said valve body between a first position with said valve seat closing off said opening when fluid flows from said inlet passage to said outlet passage, to a second position with said valve seat closing off said opening when variations in the fluid pressure in said valve takes place permitting said diaphragm to flex without opening said opening, and to a third position opening said opening by unseating said valve seat.

11. The invention as defined in claim 10 wherein said exhaust passage is an exhaust outlet fixedly secured to said backing plate, for movement therewith, and opening through said backing plate and said diaphragm, said exhaust outlet and backing plate being movable away from said relief valve when excess fluid is exhausted, and resilient sealing means associated with both said body and said exhaust outlet for permitting movement of said exhaust outlet when said excess fluid is exhausted while sealing said inlet pressure portion from said intermediate pressure portion.

12. The invention as defined in claim 11 wherein said resilient sealing means includes a sleeve surrounding said exhaust outlet having one end secured to said body remote from said relief valve and its outer end secured to said exhaust outlet in said inlet pressure portion and deformable into said inlet pressure portion when said exhaust outlet and backing plate moves to a position exhausting excess fluid out of said exhaust passage.

13. The invention as defined in claim 10 wherein said relief valve limiting means included a relief valve retainer disposed in said intermediate pressure portion engaging said valve body with stop means on said valve body engageable by said retainer, said stop means permitting limited movement of said valve body.

14. The invention as defined in claim 13 wherein said relief valve is resiliently biased by a spring having one end bearing against said valve seat and the other end bearing against said retainer.

15. The invention as defined in claim 10 wherein said valve seal means includes a resilient sealing member.

16. In a backflow preventing valve having a body with an inlet passage for connection to a source of fluid, an intermediate chamber fluidly connected to the inlet passage via an inlet check valve, an outlet passage fluidly connected to the intermediate chamber via an outlet check valve for connection to a receiver of fluid, a diaphragm chamber fluidly connected to the inlet passage and to the intermediate chamber and having a diaphragm therein dividing the diaphragm chamber into an inlet pressure portion and an intermediate pressure portion, a backing plate in said diaphragm chamber supporting said diaphragm and a relief valve in fluid communication with said intermediate pressure portion and operable by said diaphragm and backing plate to vent said intermediate pressure portion to atmosphere through an exhaust passage through said backing plate and having a valve seat and valve seal means, said inlet pressure portion being fluidly connected to the inlet passage and said intermediate pressure portion being fluidly connected to the intermediate chamber, said body including a valve seat member and a piston receiving opening therein associated with each check valve, each of said check valves including a valve piston member mounted on the body for movement relative to its respective seat member between open and closed positions, and biasing means for biasing the piston member to the closed position in the respective opening on the respective seat member, the improvement which comprises:

said valve seal means bearing against said backing plate closing off fluid communication between said exhaust passage and said intermediate pressure portion allowing slight movement of said diaphragm whereby, upon variations in the fluid pressure said diaphragm flexes a limited amount, but upon a leak of fluid from said outlet passage into said intermediate chamber, said diaphragm flexes beyond said limited amount with said backing plate moving away from abutment with said relief valve causing a space to open between said backing plate and relief valve thereby opening fluid communication between said intermediate chamber and said exhaust passage exhausting excess fluid from said intermediate chamber through said exhaust passage to the atmosphere to avoid contaminating the fluid supply said at least one of said check valves includes an outer piston member and a telescoping inner piston member and booster means associated with said biasing means for forcibly closing said at least one of said check valves in combination with said biasing means but presenting a relatively negligible resistance to opening of said at least one of said check valves by said biasing means after said at least one of said check valves reaches an initial open position, and said biasing means includes a spring associated with said piston members for biasing one of said piston members to a position closing off the respective opening in said valve seat member, said booster means including one of said piston members having a shaft extending generally along the central axis thereof and the other of said piston members having spring means thereon acting on said piston members for biasing the same in the same direction as said spring, said spring means operatively engaging said shaft.

17. The invention as defined in claim 16 wherein said spring means includes a spring having a first end secured in the other of said piston members and a pair of spaced arms extending from said first end generally parallel to the longitudinal axis of said shaft and on both sides thereof, said spring means further including a roller on each free end of each arm bearing against said shaft on opposite sides thereof.

18. The invention as defined in claim 17 wherein said booster means further includes said rollers engaging inwardly tapered portions on said shaft when said at least one of said check valves is closed.

* * * * *